Patented Oct. 20, 1953

2,656,325

UNITED STATES PATENT OFFICE 2,656,325

DYEABLE ACRYLONITRILE COPOLYMERS

Paul W. Gann and George E. Ham, Dayton, Ohio, assignors, by mesne assignments, to The Chemstrand Corporation, a corporation of Delaware No Drawing. Application February 27, 1950,
Serial No. 146,634

16 Claims. (Cl. 260—29.1)

This invention relates to a method of preparing acrylonitrile polymers having desirable receptivity for commercially available dyes. More specifically the invention relates to acrylonitrile polymers and fibers produced therefrom which can be dyed by conventional dyeing procedures utilizing acid dyes.

Polymers of acrylonitrile, such as polyacrylonitrile and copolymers of 75 or more percent of acrylonitrile and up to 25 percent of other monomers copolymerizable therewith, such as vinyl acetate, methyl methacrylate and methacrylonitrile, are well known to be excellent fiber-forming materials. However, due to poor dye receptivity, these known copolymers are of limited utility and of little value in the preparation of general purpose fibers. In copending application Serial No. 106,490, filed July 23, 1949, by George E. Ham, there are described and claimed non-dyeable acrylonitrile polymers which are capable of chemical reaction with a wide variety of reagents, including various amines and ammonia, whereby the copolymers are rendered capable of accepting dyes. This chemical reaction converts the copolymers containing α-chloroalkanecarboxylate radicals into copolymers having amino- or quaternary ammonium salt groups, which are believed to be responsible for the improved dye receptivity.

In copending application Serial No. 123,092, filed October 22, 1949, by George E. Ham, now U. S. Patent No. 2,613,196, there are described and claimed methods of preparing dye-receptive acrylonitrile polymers by copolymerizing acrylonitrile and minor proportions of vinyl chloroacetate, and thereafter converting the non-dyeable copolymers to a dyeable form by reaction with trimethylamine or triethylamine while the copolymer is dissolved in a suitable solvent, for example N,N-dimethylacetamide and N,N-dimethylformamide.

The above described dye-receptive copolymers and the methods of preparing them are subject to limitations due to the instability of the spinning solutions. The described methods are useful in the conventional fiber-spinning procedures whereby the acrylonitrile copolymers are dissolved in suitable solvents, for example N,N-dimethylformamide, N,N-dimethylacetamide, gamma-butyrolactone, and N, N-dimethylmethoxyacetamide. Solutions of the acrylonitrile polymers in the said solvents may be extruded to form fibers if the operation is conducted soon after the preparation of the solutions, otherwise gelation of the solutions may take place. If the spinning operations are not conducted promptly, or if there is an interruption of the normal spinning procedures, excessive losses of time and materials may be experienced.

The primary purpose of the present invention is to provide a method of stabilizing solutions of copolymers of acrylonitrile and esters of chloroalkanecarboxylic acids which have been rendered dye-receptive by treatment with trialkylamines. A further purpose of the invention is to provide an industrially practicable process for the preparation of high-tenacity, dyeable acrylonitrile fibers. A still further purpose of the invention is to provide stabilized solutions of dyeable acrylonitrile polymers.

In accordance with this procedure the non-dyeable fiber-forming copolymers of acrylonitrile and vinyl haloacetate are dispersed in an acrylonitrile polymer solvent, and triethylamine or trimethylamine added in a proportion suitable for quaternizing a substantial proportion of the chloroacetate radicals within a reasonable period of time. The excess of the trialkylamine is then eliminated by reaction with a reagent suitable for converting it into a quaternary ammonium salt, in which condition gelation and increases in viscosity are avoided (or minimized).

In this specification the word "gelation" is used to describe a condition of the spinning solution wherein at least some polymer exists in solid phase. This may be a complete gelation, a continuous solid phase, or it may be merely the presence of particles of solid gel in a matrix of true solution. In either case normal spinning operations are not feasible. Thus it is possible for a solution to have a measurable viscosity and yet be unspinnable due to gelation.

The reaction may take place with the polymer dissolved in the solvent or with it suspended in that medium. If the polymer is dissolved the excessive viscosity of the solutions, if actual spinning concentrations are used, often retard the formation of a homogeneous reaction mass. Such viscous solutions may not be entirely resistant to gelation, because of the difficulty in completely reacting the trialkylamine with the copolymer in viscous solution. Similarly, the reaction to eliminate the excess trialkylamine requires intimate dispersion of the quaternizing agent which cannot be accomplished without stirring or otherwise mixing for a period of time. Ultimately this procedure may provide solutions which are resistant to gelation and increases in viscosity.

A preferred method of practicing the invention involves the use of slurries of polymer instead of solutions. The fiber-forming acrylonitrile polymers, for example those of an excess of 80 percent acrylonitrile and minor proportions of vinyl chloroacetate are not readily soluble in compounds such as N,N-dimethylacetamide, N,N-dimethylformamide, gamma-butyrolactone and N,N-dimethylmethoxyacetamide. To effect solution it is usually necessary to increase the temperature, or agitate the mixture for a period of time. In the practice of this invention by the preferred method the finely divided or granular polymer is dispersed in the solvent and the reaction with trialkylamine and the subsequent reaction with a quaternizing agent are conducted while the mixture is a thin slurry and before the viscous solution is formed. With some solvents or with the more soluble polymers it may be necessary to conduct the reactions at room temperature or even under refrigerated conditions to prevent a too rapid dissolution of the polymer in the particular solvent used. It has been found that with N,N-dimethylacetamide the reaction may readily be conducted at temperatures up to 40° C. without serious dissolution of the polymer in the solvent.

The reaction of the slurry of solid polymer in the solvent under conditions which minimize the dissolution of the polymer, the trialkylamine combines with the acrylonitrile copolymer to form the quaternary ammonium salt of the vinyl chloroacetate. Obviously this is primarily a surface reaction, and often only a small proportion of the haloacetate groups are quaternized, for example from five to 50 percent. The extent of quaternization desirable or necessary to develop a beneficial result will depend upon the concentration of reactive comonomers, size of particles and time of contact. Usually the use of from 50 to 300 percent of the stoichiometric proportion of trialkylamine results in a rapid and effective quaternization of the chloroacetate groups within a few minutes. After the reaction has been conducted to a desired extent, the reaction is interrupted by adding a substance which will react with the trialkylamine to convert it to a quaternary ammonium salt. After the trialkylamine has been substantially eliminated by the quaternization, the slurry is converted to the solution by heating or otherwise subjecting it to the usual conditions for preparing acrylonitrile polymer solutions.

The unreacted trimethylamine, or triethylamine, may be combined with any agent which forms a quaternary ammonium salt, for example, esters of either organic or inorganic acids, said acids having dissociation constants greater than $10^{-4}$. Thus, aliphatic halides, for example methyl chloride, and n-butyl bromide, the alkyl nitrates, for example amyl nitrate and ethyl nitrate, the alkyl esters of oxygen-containing phosphorus acids, for example triethyl phosphate, trimethyl phosphite and tributyl phosphate, the alkyl esters of oxygen-containing sulfur acids, for example methyl p-toluenesulfonate, dimethyl sulfate and diethyl sulfate, and the aliphatic esters of other acids having dissociation constants greater than $10^{-4}$. Some esters, for example, dialkyl phthalates, the acids of which have dissociation constants greater than $10^{-4}$ with respect to one of the two ester groups and less than $10^{-4}$ for the other, are useful in the practice of this invention with respect to the more reactive grouping. The limitation with respect to the dissociation constant of the acids is used for the purpose of distinguishing the acids which are reactive with the trialkylamines at room temperatures and up to 40° C., although some of the weaker acids may be reactive at elevated temperatures.

Suitable copolymers for the practice of this invention are the copolymers of 80 to 99 percent of acrylonitrile and from one to 20 percent of an ester having the structural formula:

$$CH_2=CHO-\overset{O}{\underset{\|}{C}}-CH_2-X$$

wherein X is a halogen atom of the group consisting of chlorine and bromine. Although copolymers of 80 to 99 percent by weight of acrylonitrile and from one to 20 percent of the monomer may be utilized in the practice of this invention, a preferred group of the copolymers are those of 90 to 97 percent of the other monomer. Copolymers of 80 to 90 percent acrylonitrile have unusually desirable dye receptivity, but often are found to have less than the optimum fiber properties. On the other hand, copolymers of 97 to 99 percent of acrylonitrile and from one to three percent of the comonomer have unusually good fiber-forming properties, but often lack sufficient dye receptivity for optimum utility.

The reactive copolymers may, if desired, contain small proportions of other monomers copolymerized therewith, for example up to ten percent of styrene, methacrylonitrile, alkyl methacrylates, vinylidene chloride, alkyl fumarates, alkyl maleates, or other polymerizable mono-olefinic monomers. In general, the proportions of the other monomer should not be large or either the desirable dye affinity or the optimum fiber properties may be lost.

Further details are set forth with respect to the following specific examples.

*Example 1*

A copolymer of 94.3 percent of acrylonitrile and 5.7 percent of vinyl chloroacetate was prepared by polymerization in aqueous suspension. The polymer has a desirable high molecular weight in the fiber-forming range as manifested by a specific viscosity in 0.1 percent conc. in dimethylformamide of 0.20. A 900 gram sample of the copolymer was slurried at 45° C. with 3810 grams of dimethylacetamide. The mixture was then treated with a solution of 23.2 grams of trimethylamine in 255 grams of N,N-dimethylacetamide. The mixture was then stirred for ten minutes at which time 11.3 grams of chloroacetic acid was added. The slurry was then heated to 85° C. in order to completely dissolve the resin. The resulting solution was stable for at least 70 hours at 50° C. A similar dissolved resin which had not been treated with the chloroacetic acid increased in viscosity within a few minutes after its preparation and gelled in approximately 4 hours.

*Example 2*

A copolymer of 94.3 percent acrylonitrile and 5.7 percent of vinyl chloroacetate was polymerized in aqueous suspension to form a copolymer having a specific viscosity of 0.20 in a 0.1 percent solution in dimethylformamide. 120 grams of the copolymer was suspended in 506 grams of N,N-dimethylacetamide. The mixture was slurried at 40° C., at which temperature solution did not take place and substantially no increase in viscosity was observed. A solution of 3.1 grams of trimethylamine in 34 grams of N,N-dimethylacetamide was added to the slurry and the stirring continued at 40° C. for ten minutes in addition. A three gram portion of methyl p-toluenesulfonate was added to the slurry and the temperature was then increased to 85° C., at which temperature the N,N-dimethylacetamide dissolved the resin. The resulting solution was maintained for 70 hours at 50° C. with substantially no increase in viscosity.

The above procedure was duplicated except that the methyl p-toluenesulfonate was not added to the slurry. Within a few minutes a substantial increase in viscosity occurred and complete gelation took place in approximately four hours.

*Example 3*

The procedure of the preceding example was duplicated except that one gram of methyl chloroacetate was added to the triethylamine slurry of the copolymer in N,N-dimethylacetamide. The resulting solution did not increase in viscosity when maintained at 40° C. for twenty hours. A control experiment under identical conditions except without the methyl chloroacetate, began to increase in viscosity immediately and in 4 hours was unusable because of gelation. In another similar experiment methyl acetate failed to prevent gelation.

*Example 4*

To demonstate the critical limits with respect to the ionization constant of the acid, experiments identical to that of Example 2 were conducted using both acetic acid and oxalic acid in place of the methyl toluenesulfonate. The treated solutions gelled more rapidly than the untreated solution.

We claim:

1. A method of preparing viscosity-stabilized dyeable acrylonitrile copolymer solutions, which comprises dispersing a copolymer of 80 to 99 percent acrylonitrile and from one to 20 percent of a compound selected from the group consisting of vinyl chloroacetate and vinyl bromoacetate in a solvent for said copolymer, mixing the solution with a compound of the class consisting of trimethylamine and triethylamine, and mixing the treated dispersion with an aliphatic ester of an acid having a dissociation constant greater than $10^{-4}$.

2. A method preparing viscosity-stabilized dyeable acrylonitrile copolymer solutions, which comprises dispersing a copolymer of 80 to 99 percent acrylonitrile and from one to 20 percent of vinyl chloroacetate in an acrylonitrile copolymer solvent at a temperature below which solution will take place, mixing the dispersion with triethylamine, mixing the dispersion with an alkyl ester of an acid having a dissociation constant greater than $10^{-4}$, and heating the suspension to form a solution.

3. A method of preparing viscosity-stabilized dyeable acrylonitrile copolymer solutions, which comprises dispersing a copolymer of 80 to 99 percent acrylonitrile and from one to 20 percent of vinyl chloroacetate in an acrylonitrile copolymer solvent at a temperature below which solution will take place, mixing the dispersion with trimethylamine, mixing the dispersion with an alkyl ester of an acid having a dissociation constant greater than $10^{-4}$, and heating the suspension to form a solution.

4. The procedure of claim 16, wherein the quaternizing agent is methyl toluenesulfonate.

5. The procedure of claim 16, wherein the quaternizing agent is chloroacetic acid.

6. The procedure of claim 16, wherein the quaternizing agent is methyl chloroacetate.

7. The procedure of claim 16, wherein the quaternizing agent is butyl bromide.

8. The procedure of claim 16, wherein the quaternizing agent is dimethyl sulfate.

9. The method according to claim 1, wherein the dispersion is treated with triethylamine.

10. The method according to claim 1, wherein the dispersion is treated with trimethylamine.

11. The procedure of claim 2, wherein the quaternizing agent is methyl p-toluenesulfonate.

12. The procedure of claim 2, wherein the quaternizing agent is methyl chloroacetate.

13. The procedure of claim 2, wherein the quaternizing agent is dimethyl sulfate.

14. The procedure of claim 3, wherein the quaternizing agent is methyl toluenesulfonate.

15. The procedure of claim 3, wherein the quaternizing agent is chloroacetic acid.

16. A method of preparing viscosity-stabilized dyeable acrylonitrile copolymer solutions, which comprises dispersing a copolymer of 80 to 99 percent acrylonitrile and from one to 20 percent of a compound selected from the group consisting of vinyl chloroacetate and vinyl bromoacetate in a solvent for said copolymer, mixing the dispersion with a compound of the class consisting of triethylamine and trimethylamine, and mixing the treated dispersion with a quaternizing agent selected from the group consisting of an acid having a dissociation constant greater than $10^{-4}$ and esters thereof.

PAUL W. GANN.
GEORGE E. HAM.

References Cited in the file of this patent

UNITED STATES PATENTS

| Number | Name | Date |
| --- | --- | --- |
| 2,502,030 | Scheiderbauer | Mar. 28, 1950 |
| 2,503,244 | Coover et al. | Apr. 11, 1950 |
| 2,503,245 | Coover et al. | Apr. 11, 1950 |

FOREIGN PATENTS

| Number | Country | Date |
| --- | --- | --- |
| 597,368 | Great Britain | Jan. 23, 1948 |